(12) United States Patent
Yoo et al.

(10) Patent No.: US 10,322,693 B2
(45) Date of Patent: Jun. 18, 2019

(54) VEHICLE AIRBAG

(71) Applicant: AUTOLIV DEVELOPMENT AB, Vårgårda (SE)

(72) Inventors: Wan-Dong Yoo, Hwasung (KR); Yong Hyun Jung, Hwasung (KR); Tae Ik Gwon, Hwasung (KR); Dong Young Kim, Hwasung (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 52 days.

(21) Appl. No.: 15/529,578

(22) PCT Filed: Nov. 13, 2015

(86) PCT No.: PCT/KR2015/012201
§ 371 (c)(1),
(2) Date: May 25, 2017

(87) PCT Pub. No.: WO2016/085168
PCT Pub. Date: Jun. 2, 2016

(65) Prior Publication Data
US 2017/0313276 A1    Nov. 2, 2017

(30) Foreign Application Priority Data
Nov. 27, 2014  (KR) .................... 10-2014-0167866

(51) Int. Cl.
*B60R 21/00* (2006.01)
*B60R 21/203* (2006.01)
(Continued)

(52) U.S. Cl.
CPC .......... *B60R 21/233* (2013.01); *B60R 21/203* (2013.01); *B60R 21/231* (2013.01);
(Continued)

(58) Field of Classification Search
CPC .............. B60R 21/233; B60R 21/2334; B60R 21/23138; B60R 21/232; B60R 21/231;
(Continued)

(56) References Cited

U.S. PATENT DOCUMENTS

| 7,967,334 B2 | 6/2011 | Breuninger et al. |
| 8,888,128 B1 | 11/2014 | Seo |

(Continued)

FOREIGN PATENT DOCUMENTS

| JP | H03-067748 A | | 3/1991 | |
| JP | 2016107730 A | * | 6/2016 | ........... B60R 21/233 |

(Continued)

OTHER PUBLICATIONS

International Search Report for PCT/KR2015/012201, ISA/KR, Daejeon, dated Mar. 31, 2016.

*Primary Examiner* — Drew J Brown
(74) *Attorney, Agent, or Firm* — Stephen T. Olson; Harness, Dickey & Pierce, P.L.C.

(57) ABSTRACT

A vehicle airbag includes a main panel to form a main chamber deployed toward an inner part of a vehicle, and a protrusion panel provided outside the main panel to form at least one protrusion chamber that communicates with the main chamber and protrudes toward the inner part of the vehicle based on the main chamber. The protrusion panel is folded to have a wrinkle part when the vehicle airbag is not inflated.

15 Claims, 14 Drawing Sheets

(51) Int. Cl.
  *B60R 21/206* (2011.01)
  *B60R 21/231* (2011.01)
  *B60R 21/232* (2011.01)
  *B60R 21/233* (2006.01)
  *B60R 21/235* (2006.01)
  *B60R 21/237* (2006.01)
  *B60R 21/239* (2006.01)
  *B60R 21/2334* (2011.01)

(52) U.S. Cl.
  CPC .......... *B60R 21/232* (2013.01); *B60R 21/237* (2013.01); *B60R 21/239* (2013.01); *B60R 21/2334* (2013.01); *B60R 21/23138* (2013.01); *B60R 21/206* (2013.01); *B60R 2021/0032* (2013.01); *B60R 2021/0048* (2013.01); *B60R 2021/0051* (2013.01); *B60R 2021/23107* (2013.01); *B60R 2021/23169* (2013.01); *B60R 2021/23308* (2013.01); *B60R 2021/23324* (2013.01); *B60R 2021/23538* (2013.01)

(58) Field of Classification Search
  CPC ... B60R 21/237; B60R 21/239; B60R 21/203; B60R 21/206; B60R 2021/0048; B60R 2021/0032; B60R 2021/23169; B60R 2021/23538; B60R 2021/23107; B60R 2021/0051; B60R 2021/23324; B60R 2021/23308
  See application file for complete search history.

(56) References Cited

U.S. PATENT DOCUMENTS

| | | | | |
|---|---|---|---|---|
| 9,469,270 B2 * | 10/2016 | Abe | ............... | B60R 21/233 |
| 9,550,470 B2 * | 1/2017 | Suk | ............... | B60R 21/232 |
| 9,555,762 B2 * | 1/2017 | Umehara | ............... | B60R 21/233 |
| 9,650,011 B1 * | 5/2017 | Belwafa | ............... | B60R 21/233 |
| 9,713,996 B2 * | 7/2017 | Park | ............... | B60R 19/48 |
| 9,771,046 B2 * | 9/2017 | Lee | ............... | B60R 21/232 |
| 9,789,842 B2 * | 10/2017 | Shin | ............... | B60R 21/2176 |
| 9,809,189 B2 * | 11/2017 | Grell | ............... | B60R 21/232 |
| 9,845,067 B2 * | 12/2017 | Morris | ............... | B60R 21/233 |
| 2007/0108745 A1 * | 5/2007 | Belwafa | ............... | B60R 21/23138 280/730.2 |
| 2008/0048420 A1 * | 2/2008 | Washino | ............... | B60R 21/203 280/731 |
| 2009/0085333 A1 | 4/2009 | Imaeda et al. | | |
| 2010/0253054 A1 | 10/2010 | Chida et al. | | |
| 2011/0175334 A1 | 7/2011 | Miller et al. | | |
| 2013/0001934 A1 * | 1/2013 | Nagasawa | ............... | B60R 21/233 280/731 |
| 2014/0203541 A1 * | 7/2014 | Wei | ............... | B60R 21/213 280/730.2 |
| 2014/0210189 A1 | 7/2014 | Fukawatase | | |
| 2016/0046254 A1 * | 2/2016 | Yamada | ............... | B60R 21/233 280/729 |
| 2016/0052479 A1 * | 2/2016 | Komatsu | ............... | B60R 21/231 280/730.1 |
| 2016/0096503 A1 * | 4/2016 | Lee | ............... | B60R 21/231 280/743.2 |
| 2017/0101071 A1 * | 4/2017 | Kruse | ............... | B60R 21/0136 |
| 2017/0158154 A1 * | 6/2017 | Kobayashi | ............... | B60R 21/01332 |
| 2017/0217399 A1 * | 8/2017 | Patel | ............... | B60R 21/233 |
| 2018/0001863 A1 * | 1/2018 | Nakanishi | ............... | B60R 21/203 |
| 2018/0111583 A1 * | 4/2018 | Jaradi | ............... | B60R 21/231 |
| 2018/0126946 A1 * | 5/2018 | Bausch | ............... | B60R 21/233 |

FOREIGN PATENT DOCUMENTS

| | | | | |
|---|---|---|---|---|
| JP | 2017024478 A | * | 2/2017 | ............ B60R 21/233 |
| JP | 2017100685 A | * | 6/2017 | ........ B60R 21/01332 |
| KR | 2014-0072525 A | | 6/2014 | |
| KR | 10-1460725 B1 | | 11/2014 | |

* cited by examiner

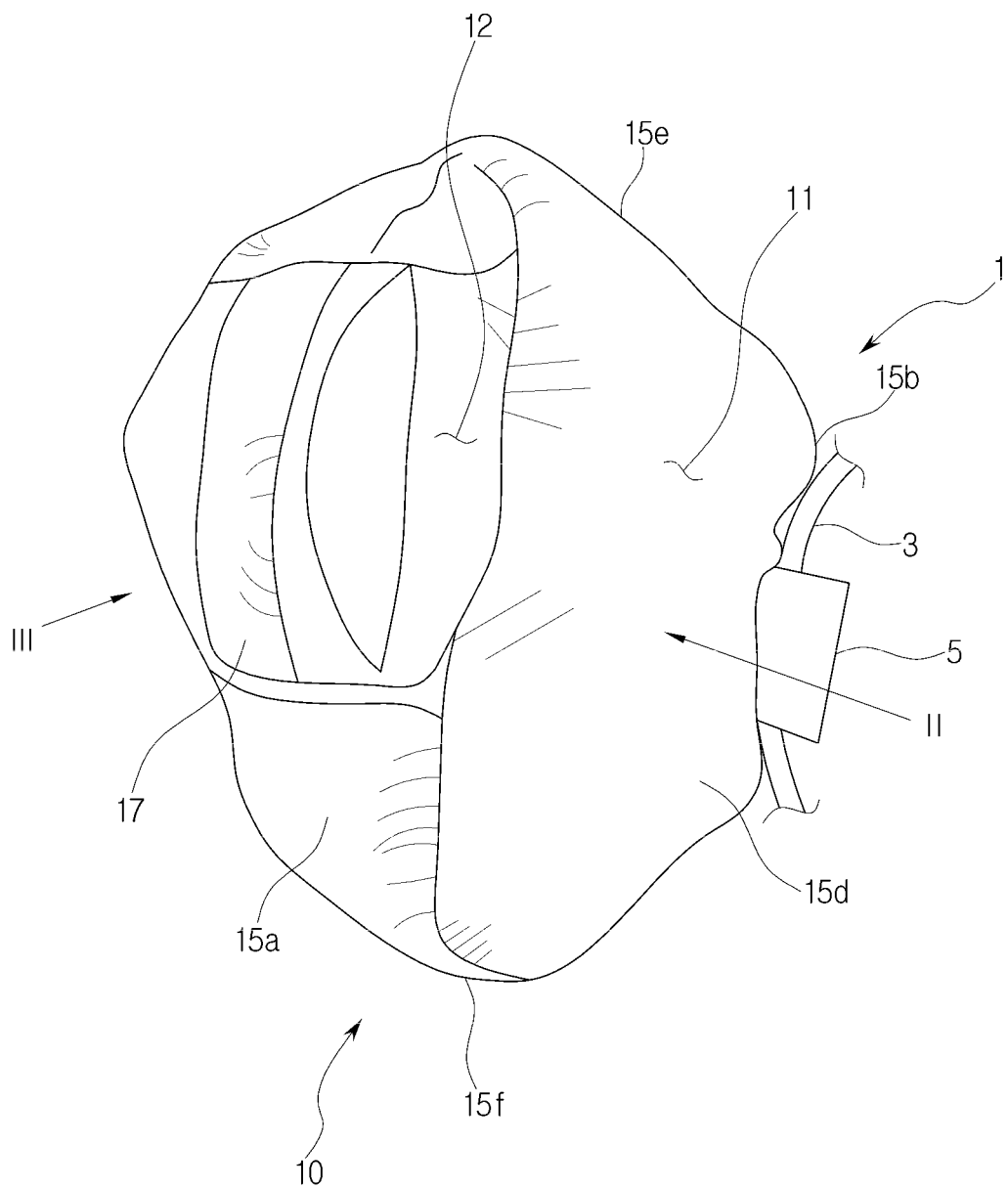
[FIG. 1]

[FIG. 2]
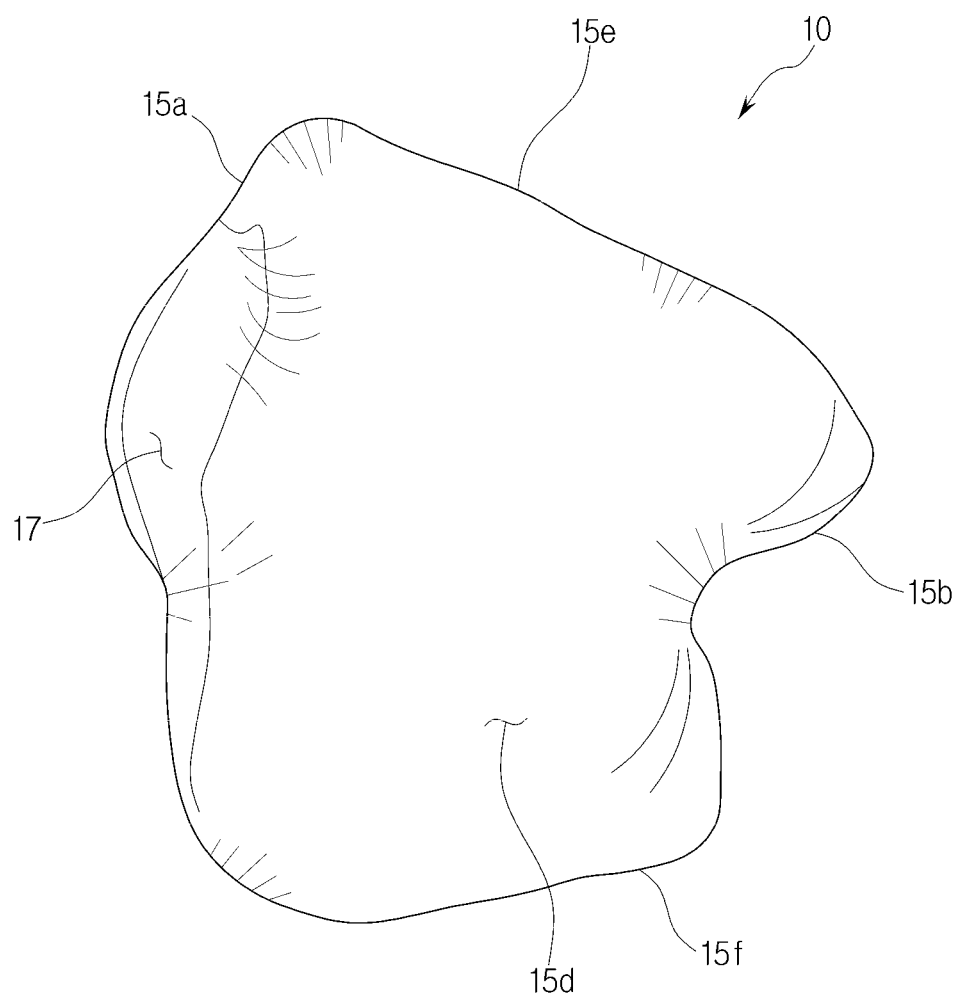

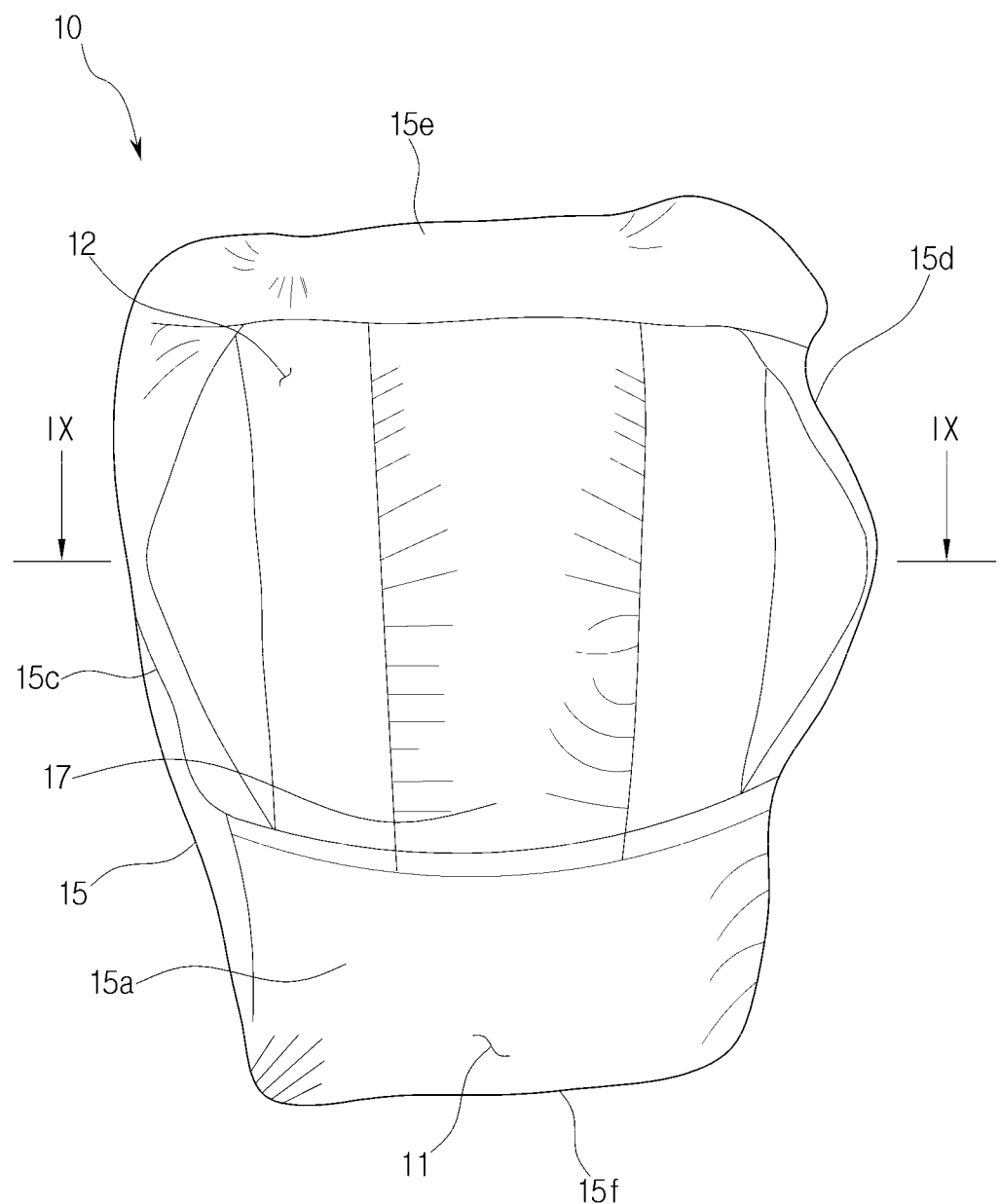
[FIG. 3]

[FIG. 4]
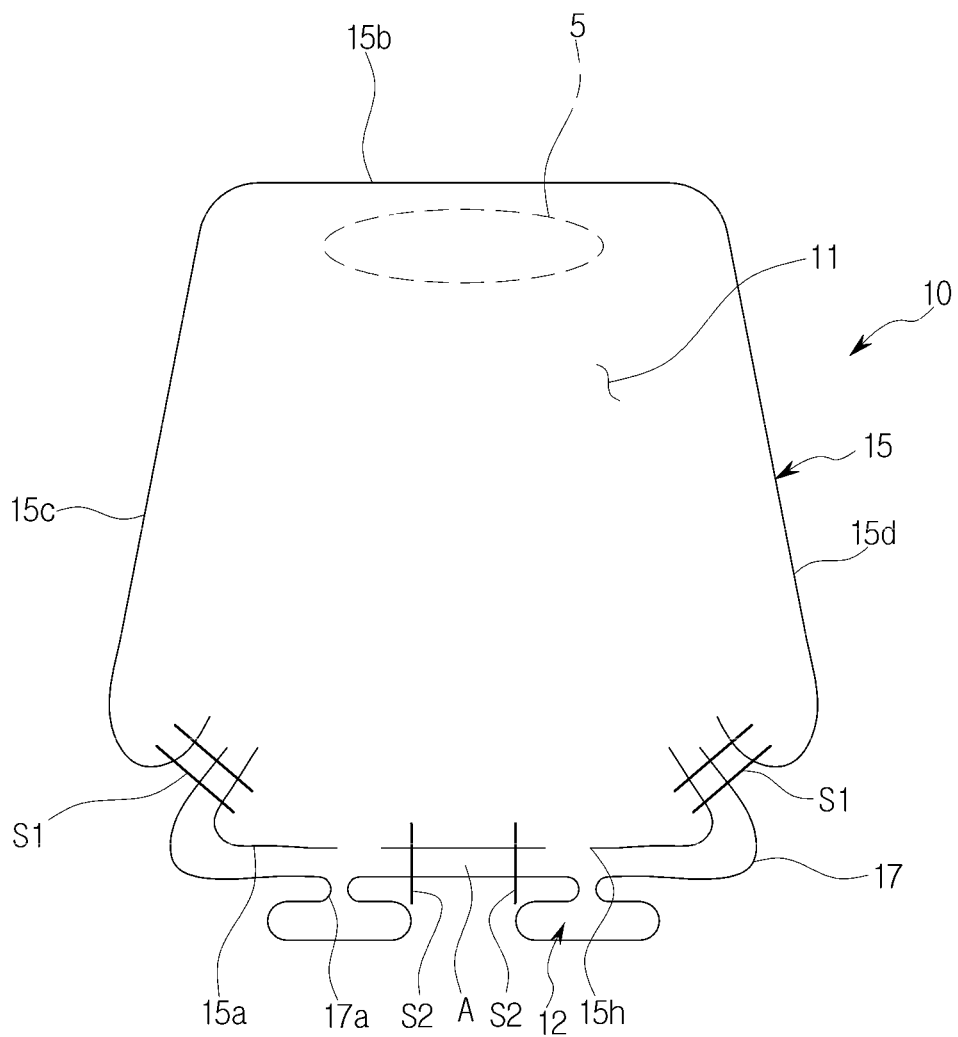

【FIG. 5】
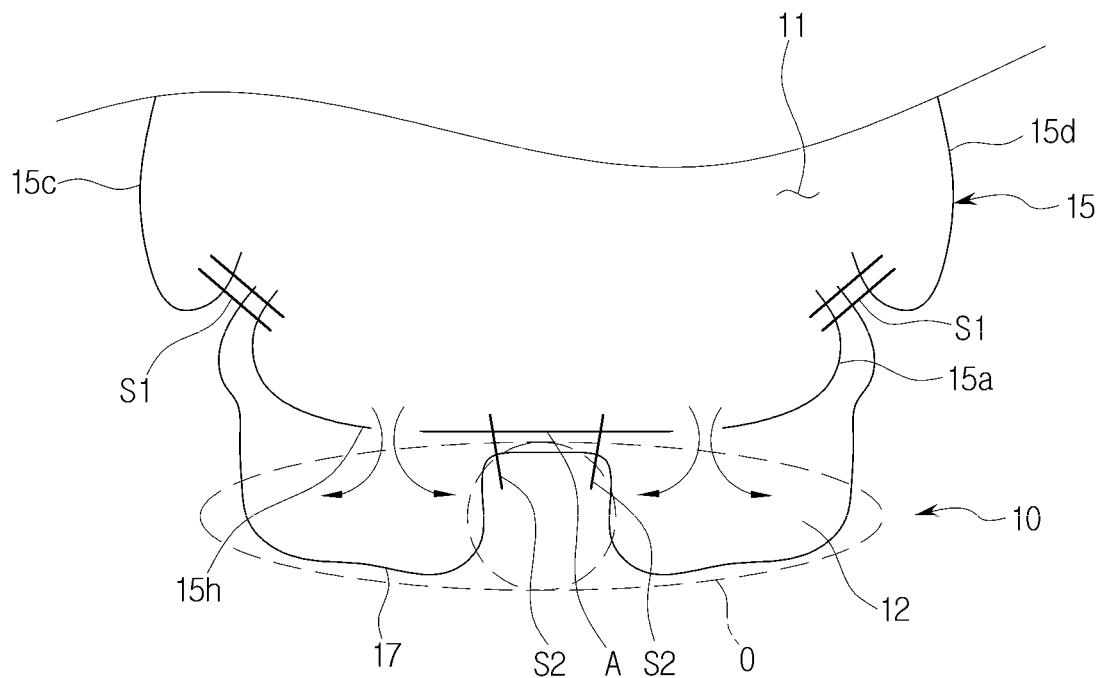
【FIG. 6】
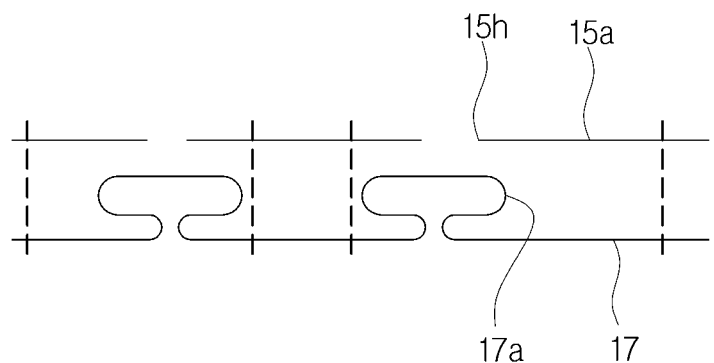

[FIG. 7]
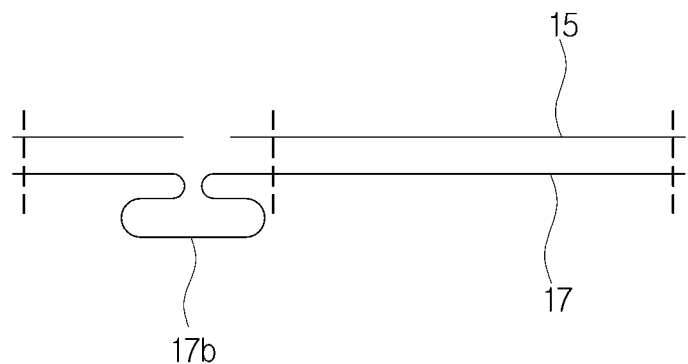
[FIG. 8]
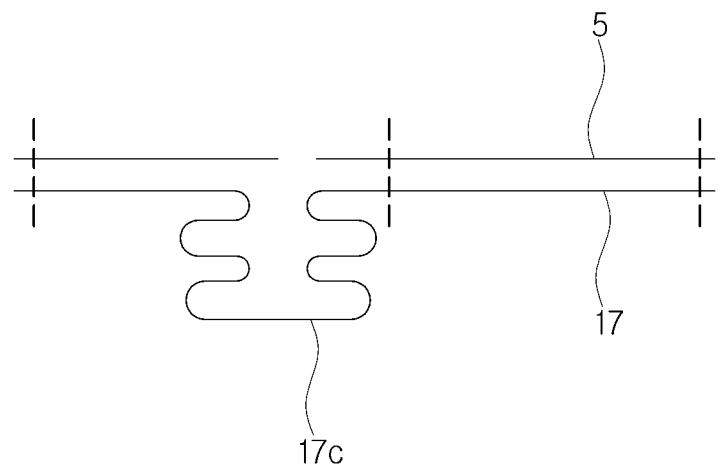

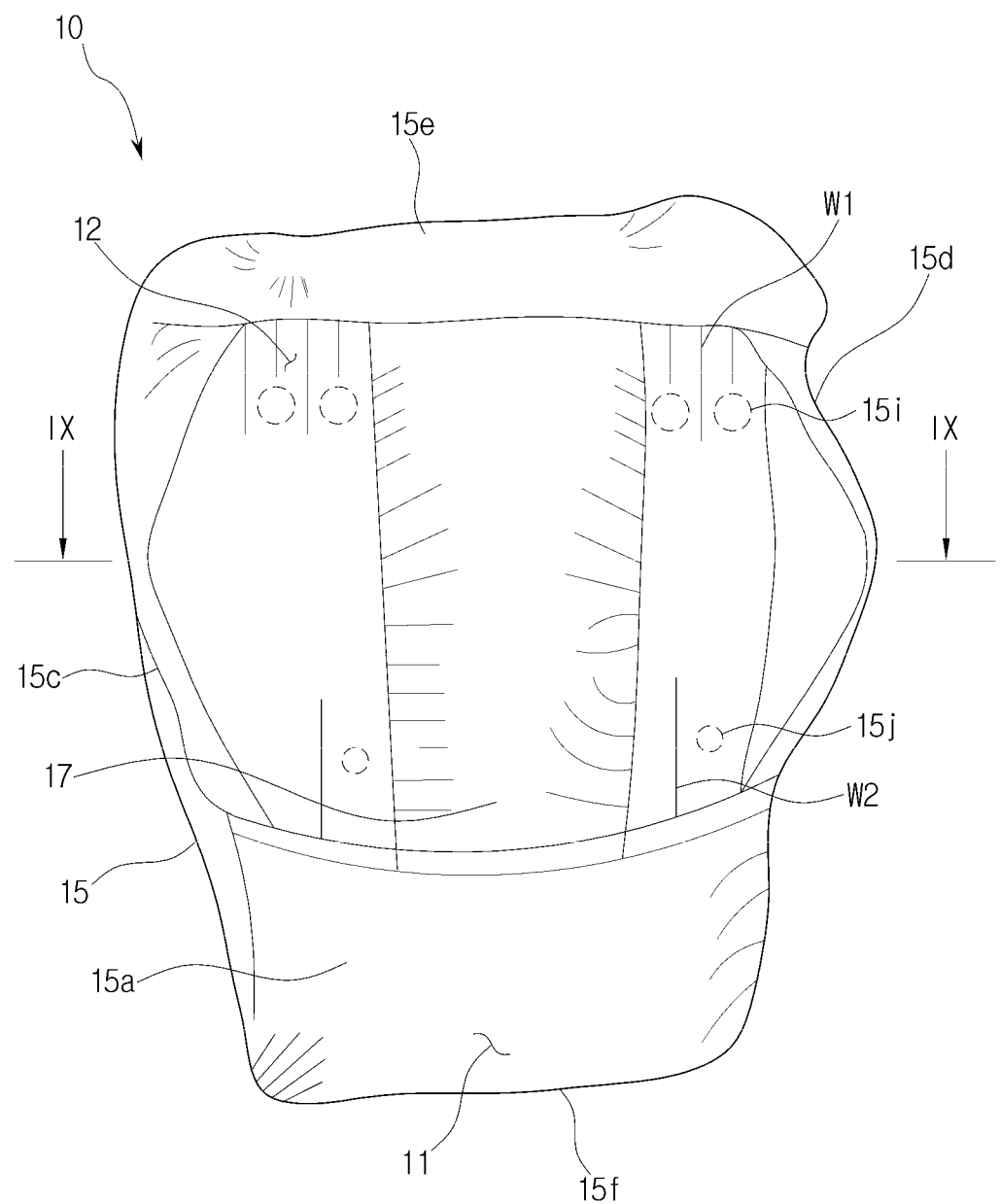
[FIG. 9]

[FIG. 10]
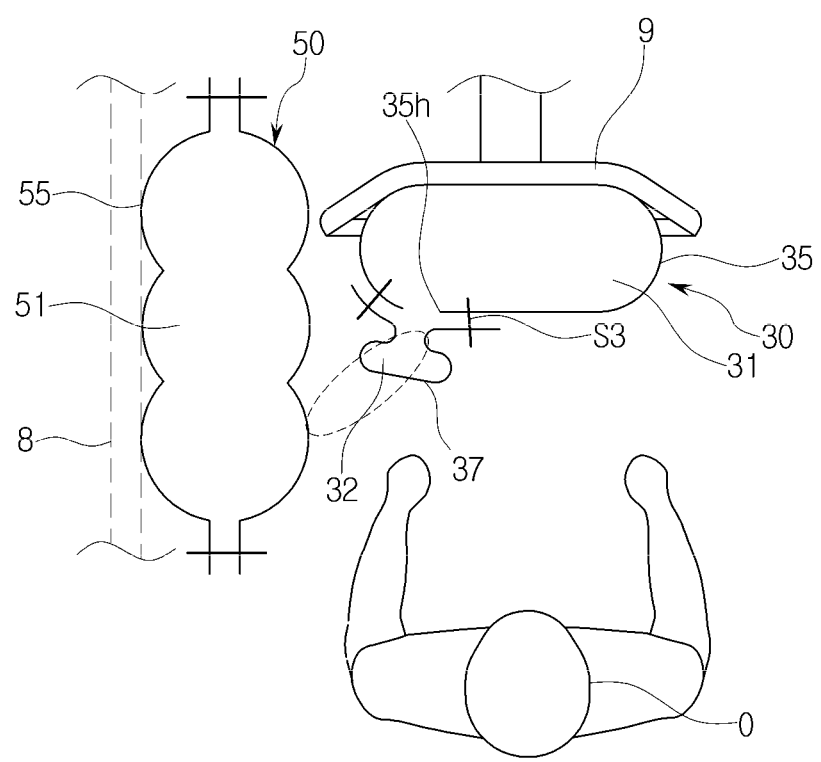

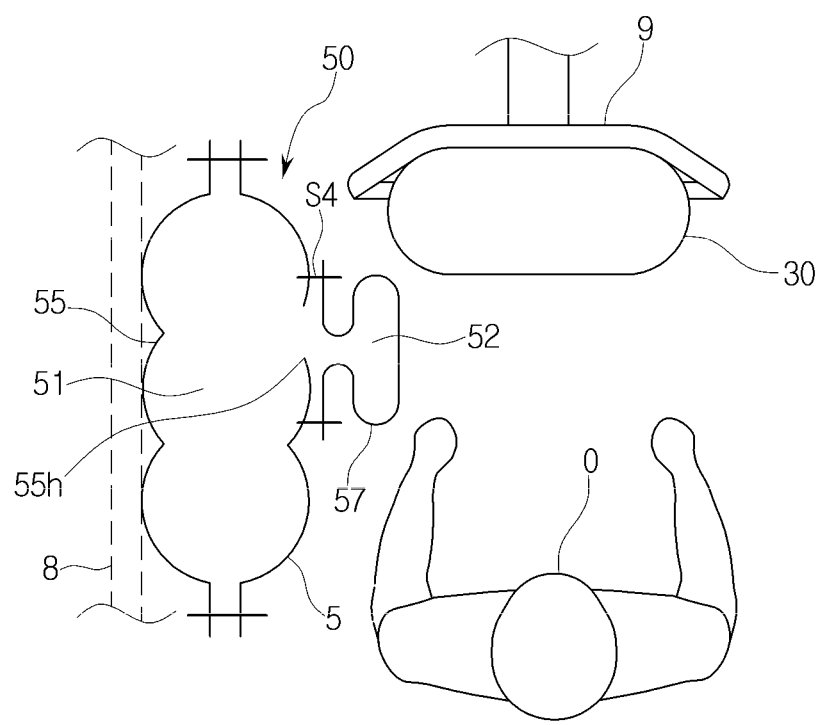
[FIG. 11]

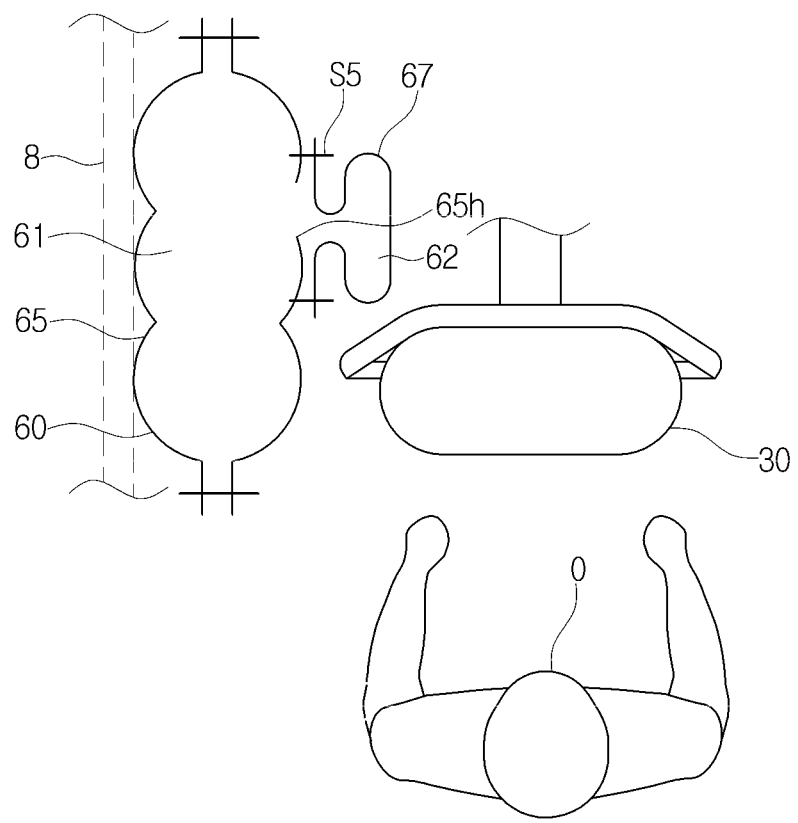
[FIG. 12]

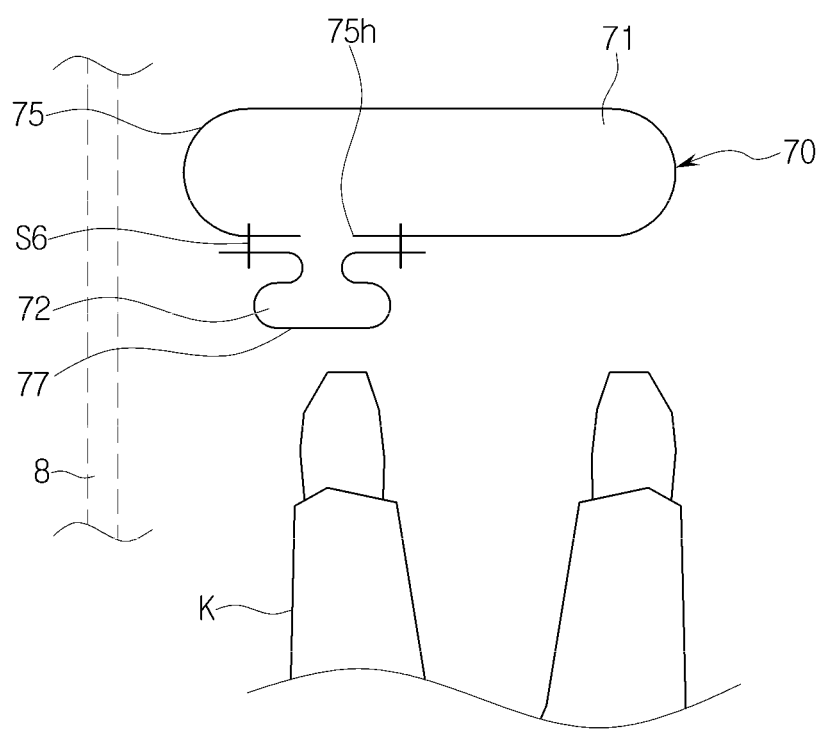
【FIG. 13】

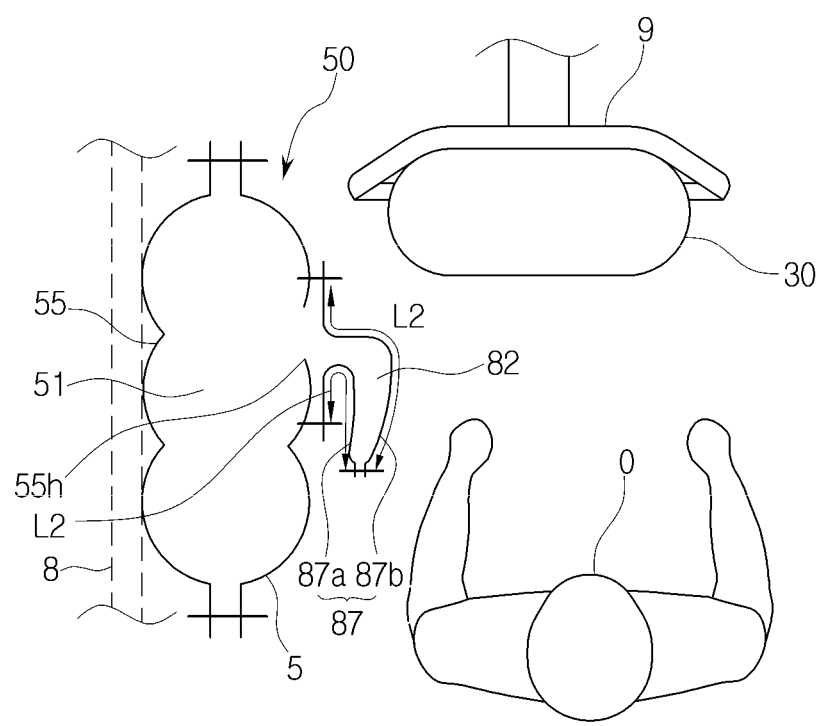

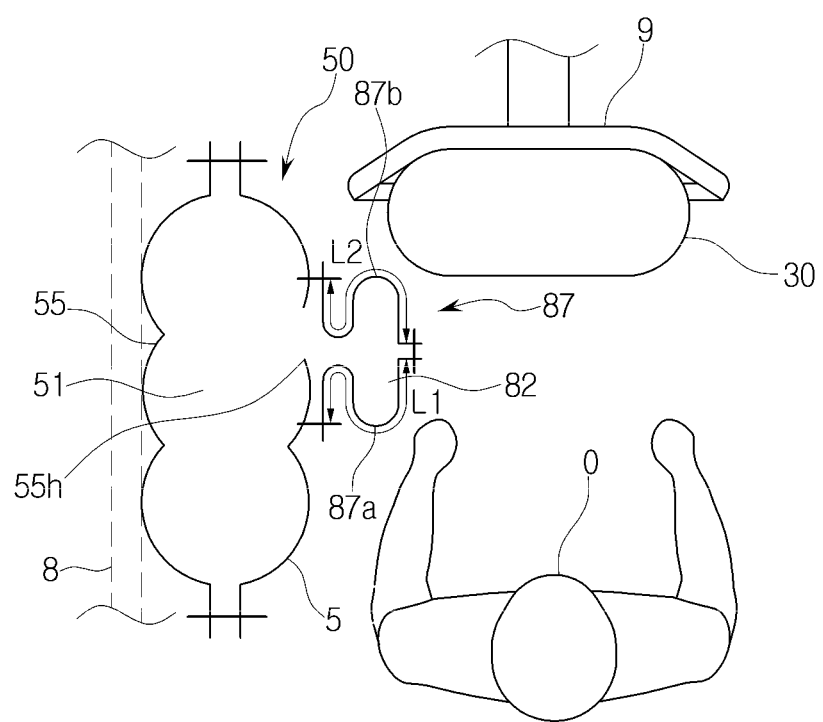
【FIG. 14b】

[FIG. 14c]
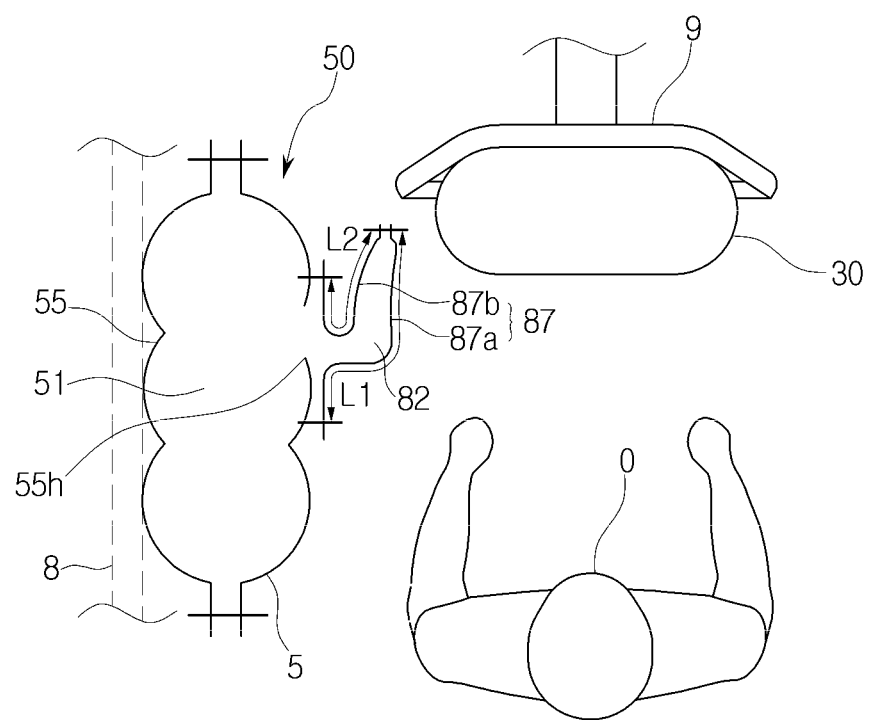

VEHICLE AIRBAG

CROSS-REFERENCE TO RELATED APPLICATIONS

This application is a 371 U.S. National Stage of International Application No. PCT/KR2015/012201, filed on Nov. 13, 2015, which claims the benefit of and priority to Korean Patent Application No. 10-2014-0167866, filed on Nov. 27, 2014. The entire disclosures of the above applications are incorporated herein by reference.

TECHNICAL FIELD

The present invention relates to a vehicle airbag, capable of protecting an occupant upon vehicle crash. More specifically, the present invention relates to a vehicle airbag, which has a protrusion chamber inflated while more protruding toward an inner part of the vehicle than a main airbag protrudes.

BACKGROUND ART

An airbag is an occupant confining device inflated and developed upon the occurrence of an accident to protect an occupant. The airbag is provided in a vehicle to prevent the occupant from colliding with an instrument panel and a side portion of the vehicle.

Various types of airbags are provided according to the installation position or the use thereof. For example, a front airbag is installed in a steering wheel or an upper portion of an instrument panel to protect the occupant from head-on collision of a vehicle.

A side airbag is installed at a door beside a seat to protect an upper body of the occupant from side collision of the vehicle.

A curtain-type airbag is installed at a roof side rail in a roof head trim to prevent a head of the occupant from colliding with a window upon the rollover of the vehicle.

The above airbags are folded in small size or received in a wound state within a limited installation space range under a normal situation. Under an urgent situation, the airbags are rapidly inflated and deployed toward a target region using gas to protect an occupant from accident.

DISCLOSURE OF INVENTION

Technical Problem

An object of the present invention is to provide a vehicle airbag, capable of more sufficiently protecting an occupant by additionally providing a protrusion chamber at one side of a main chamber inflated toward the occupant so that the protrusion chamber is more inflated toward an inner part of the vehicle than a main chamber inflated toward the occupant, at one side of the main chamber.

Solution to Problem

According to one embodiment, there is provided a vehicle airbag including a main panel to form a main chamber deployed toward an inner part of a vehicle, and a protrusion panel provided outside the main panel to form at least one protrusion chamber that communicates with the main chamber and protrudes toward the inner part of the vehicle based on the main chamber. The protrusion panel is folded to have a wrinkle part when the vehicle airbag is not inflated.

The wrinkle part may be formed by folding the protrusion panel toward the main panel or toward the inner part of the vehicle.

An inflation volume of the at least one protrusion chamber may be adjusted by adjusting the number of wrinkle parts.

The number of upper wrinkle parts of the protrusion panel may be different from the number of lower wrinkle parts of the protrusion panel.

The number of the at least one vent hole or a size of the at least one vent hole may be varied depending on the inflation volume of the at least one protrusion chamber.

The protrusion panel may include first and second panels and a deployment shape of the at least one protrusion chamber may be controlled by adjusting lengths of the first and second panels.

The vehicle airbag may include at least one of a driver seat airbag, a passenger seat airbag, a side curtain airbag, and a knee airbag.

The passenger seat airbag may include the main panel comprising a front panel that makes contact with a head of an occupant, and the protrusion panel coupled to an outside of the front panel and provided in at least one side thereof with the wrinkle part.

Both ends of the protrusion panel may be coupled to both ends of the front panel, the protrusion panel may be provided at a central portion thereof with central sewing lines spaced apart from each other by a predetermined distance, and a non-inflation region may be formed between the central sewing lines, and the at least one vent hole may be formed in the main panel between the central sewing lines and the both ends of the protrusion panel such that two protrusion chambers may inflated about the non-inflation region.

The driver seat airbag may include the main chamber inflated toward an occupant from a steering wheel of the vehicle, and the at least one protrusion chamber that more protrudes toward the inner part of the vehicle than the main chamber and is inflated adjacent to a lateral side of the vehicle.

The side curtain airbag may include the main chamber inflated along a lateral side of the vehicle, and the at least one protrusion chamber provided at a front end of the main chamber and inflated to more protrude toward the inner part of the than the main chamber. The at least one protrusion chamber may block a space between the driver seat airbag and the side curtain airbag or supports a front side of the driver seat airbag.

The knee airbag may include the main chamber inflated toward a leg of an occupant, and the at least one protrusion chamber that communicates with the main chamber, more protrudes the leg of the occupant than the main chamber, and is inflated adjacent to a lateral side of the vehicle.

Advantageous Effects of Invention

As described above, according to one embodiment of the present invention, the protrusion chamber protruding toward the interior of the vehicle from both front sides of the passenger seat airbag is additionally provided, so that the head of the occupant can make contact with the space between the protrusion chambers, and can be prevented from being inclined to the lateral side of the vehicle, thereby more sufficiently protecting the occupant.

According to another embodiment of the present invention, the head of the occupant can be prevented from protruding to the space between the driver seat airbag and the lateral side of the vehicle by providing the protrusion chamber, which is more inflated toward the inner part of the vehicle than the main chamber of the driver seat airbag, at a portion of the driver seat airbag adjacent to the lateral side of the vehicle.

According to still another embodiment of the present invention, the protrusion chamber is provided at the front end of the side curtain airbag to more protrude toward the inner part of the vehicle than the main chamber of the side curtain airbag, thereby blocking the space between the side curtain airbag and the driver seat airbag, or supporting the front of the driver seat airbag. Accordingly, the head of the occupant can be prevented from protruding to the space between the driver seat airbag and the side curtain airbag.

According to still another embodiment of the present invention, the protrusion chamber is provided at one side of the main chamber constituting the knee airbag to more protrude toward the inner part of the vehicle than the main chamber, thereby preventing the knee of the occupant from colliding with the lateral side of the vehicle.

BRIEF DESCRIPTION OF DRAWINGS

FIG. 1 is a perspective view showing an inflated state of a passenger seat vehicle airbag according to an embodiment of the present invention.

FIG. 2 is a side view taken along arrow II of FIG. 1.

FIG. 3 is a front view taken along arrow BI of FIG. 1.

FIG. 4 is a cross sectional view taken along IV-IV of FIG. 3.

FIG. 5 is a cross sectional view showing the state that a protrusion chamber of FIG. 4 is fully inflated.

FIG. 6 is a partial cross sectional view showing a wrinkle part of FIG. 3 folded through another folding scheme.

FIG. 7 is a partial cross sectional view showing another example of the wrinkle part of FIG. 3.

FIG. 8 is a partial cross sectional view showing still another example of the wrinkle part of FIG. 3.

FIG. 9 is a front view showing a passenger seat airbag according to another embodiment of the present invention.

FIG. 10 is a cross sectional view showing a driver seat airbag according to another embodiment of the present invention.

FIG. 11 is a cross sectional view showing the configuration of a side curtain airbag according to still another embodiment of the present invention.

FIG. 12 is a cross sectional view showing another example of the side curtain airbag of FIG. 11.

FIG. 13 is a cross sectional view showing the configuration of a knee airbag according to still another embodiment of the present invention.

FIGS. 14a to 14c are cross sectional views showing the configuration of protrusion chambers according to still another embodiment of the present invention.

MODE FOR THE INVENTION

Hereinafter, embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

FIG. 1 is a perspective view showing an inflated state of a passenger seat vehicle airbag according to an embodiment of the present invention. FIG. 2 is a side view taken along arrow II of FIG. 1. FIG. 3 is a front view taken along arrow III of FIG. 1.

Referring to FIGS. 1 to 3, a passenger seat airbag device 1 includes a passenger seat airbag 10, which is received in a folded sate inside an upper instrument panel 3 under a normal situation, and an inflator 5 to supply inflation gas into the passenger seat airbag 10.

The passenger seat airbag 10 is inflated into a vehicle by gas generated from the inflator 5 upon vehicle crash. The inflated passenger seat airbag 10 accommodates and confines an occupant therein.

The passenger seat airbag 10 includes a main chamber 11 and protrusion chambers 12 provided at both sides of the main chamber 11. When viewed from a plan view, the passenger seat airbag 10 has a concave part and protrusion parts formed at both sides of the concave part.

The passenger seat airbag 10 includes a main panel 15 to form the main chamber 11 and a protrusion panel 17 provided outside the main panel 15 to form the protrusion chambers 12.

The main panel 15 may include a front panel 15a facing a passenger, a rear panel 15b opposite to the front panel 15a, side panels 15c and 15d provided at both sides of the front and rear panels 15a and 15b, and top and bottom panels 15e and 15f provided on and under the front and rear panels 15a and 15b. The main panel 15 may include the front panel 15a, the rear panel 15b, the side panels 15c and 15d, the top panel 15e and the bottom panel 15f formed using a single member. According to another embodiment, the main panel 15 may include a front panel, a rear panel, a side panel, a top panel, and a bottom panel that are separated from each other.

The protrusion panel 17 is coupled to an outer portion of the front panel 15a to form two protrusion chambers 12 inflated forward of the front panel 15 when the airbag is inflated.

The protrusion panel 17 has at least one wrinkle part W when the airbag is not inflated. FIG. 4 is a cross sectional view taken along IV-IV of FIG. 3. FIG. 5 is a cross sectional view showing the state that a protrusion chamber of FIG. 4 is fully inflated.

Referring to FIGS. 4 and 5, the passenger seat airbag 10 includes the main panel 15 to form the main chamber 11 and the protrusion panel 17 provided outside of the main panel 15 to form the protrusion chamber 12.

The protrusion panel 17 is coupled to both outer portions of the front panel 15a constituting the main panel 15 through a sewing line S1.

The protrusion panel 17 has the central portion coupled with the central portion of the front panel 15a through a central sewing line S2. A region A between central sewing lines S2 of the protrusion panel 17 includes a non-inflation region. The non-inflation region substantially includes a concave part in the state that the airbag is inflated.

Wrinkle parts 17a are formed between both ends of the protrusion panels 17 and the central sewing lines S2 by folding the protrusion panel 17 at least one time. The wrinkle part 17a is maintained in a wrinkled state when the passenger seat airbag 10 is not inflated. When the passenger seat airbag 10 is fully inflated, the wrinkle part 17a forms the protrusion chamber 12. The wrinkle part 17a is folded toward an occupant O.

Vent holes 15h are formed through the front panel 15a at which the protrusion chambers 12 are positioned. The main chamber 11 communicates with the protrusion chambers 12 through the vent holes 15h.

According to the passenger seat airbag 10 having the above-described configuration, the main chamber 11 is inflated upon the vehicle crash, and the protrusion chambers 12 communicating with the main chamber 11 are inflated at the front of both sides of the main chamber 11.

One of two protrusion chambers 12, which is closer to a lateral side of the vehicle, may be configured to have an inflation volume greater than that of the other.

Next, the head of the occupant O, for example the face of the occupant O, makes contact with the concave part formed between the protrusion chambers 12 to protect the head of the occupant O. The protrusion chambers 12 prevent the head of the occupant O from being inclined to the lateral side of the vehicle or the inner part of the vehicle.

FIG. 6 is a partial cross sectional view showing the wrinkle part of FIG. 3 folded through another folding scheme.

Referring to FIG. 6, the wrinkle part 17a is formed by folding the passenger seat airbag toward the occupant O at least one time.

FIG. 7 is a partial cross sectional view showing another example of the wrinkle part of FIG. 3.

Referring to FIG. 7, the wrinkle part 17b of the protrusion panel 17 may be provided in at least one place of the main panel 15.

FIG. 8 is a partial cross sectional view showing still another example of the wrinkle part of FIG. 3.

Referring to FIG. 8, a wrinkle part 17c of the protrusion panel 17 may increase the inflation volume of the protrusion chamber 12 by more increasing the number of wrinkles of the wrinkle part 17c than those of the wrinkle parts 17a and 17b. In other words, the size of the inflation volume of the protrusion chamber 12 may be be adjusted by adjusting the number of wrinkles of the wrinkle part.

FIG. 9 is a front view showing a passenger seat airbag according to another embodiment of the present invention.

Upper and lower wrinkle parts W1 and W2 of the protrusion panel 17 provided in the passenger seat airbag 10 may be configured to be different from each other in number.

As shown in FIG. 9, if the number of the upper wrinkle parts W1 is larger than the number of the lower wrinkle parts W2, the protrusion chamber 12 may be formed to have an upper region larger than a lower region.

In this case, the dimension and/or size of a vent hole 15i corresponding to the upper region of the protrusion chamber 12 may be larger than the dimension and/or the size of a vent hole 15j corresponding to the lower region of the protrusion chamber 12. Through the above configuration, a larger amount of gas is supplied from the main chamber 11 to the protrusion chambers 12, so that the upper region of the protrusion chamber 12 having a larger inflation volume can be more rapidly inflated.

The above configuration may be applied to a driver seat airbag, a side curtain airbag, and a knee airbag, which are described later, in addition to the passenger seat airbag 10.

FIG. 10 is a cross sectional view showing a driver seat airbag according to another embodiment of the present invention.

Referring to FIG. 10, the passenger seat airbag device 1 includes a driver seat airbag 30 and a vehicle side curtain airbag 50.

The driver seat airbag 30 is stored in a folded state inside a steering wheel 9 under a normal situation. Upon vehicle crash, the driver seat airbag 30 is inflated toward an occupant O seated at a driver seat by gas pressure.

The vehicle side curtain airbag 50 is stored in a folded state inside a headliner (not shown) of the vehicle. Upon the vehicle crash, the vehicle side curtain airbag 50 is directed toward the inner part of the vehicle and inflated and deployed downward along an inner lateral side 8 of the vehicle.

The driver seat airbag 30 includes a main chamber 31 arranged substantially in parallel to the lateral side of the vehicle and a protrusion chamber 32 communicating with a front end portion of the main chamber 31. The driver seat airbag 30 includes a main panel 35 to confine the main chamber 31 and a protrusion chamber 37 to confine the protrusion chamber 32.

The protrusion chamber 32 protrudes toward the inner part of the vehicle more than the man chamber 31, and is positioned between the driver seat airbag 30 and the side curtain airbag 50. To this end, the protrusion panel 37 is coupled to the main panel 35 of the driver seat airbag 30 through a sewing line S3 formed at an outer portion of the main panel 35 of the driver seat airbag 30. In other words, the protrusion panel 37 is coupled to a portion of the driver seat airbag 30 adjacent to the lateral side of the vehicle.

The main panel 35 is formed therein with a vent hole 35h communicating with the protrusion chamber 32.

Through the above configuration, upon the vehicle crash, the protrusion chamber 32 blocks the space between a main chamber 51 of the side curtain airbag 50 and the main chamber 31 of the driver seat airbag 30. As a result, the head of the occupant O is blocked from protruding toward the space between the driver seat airbag 30 and the side curtain airbag 50, so that the occupant O can be protected from vehicle crash.

FIG. 11 is a cross sectional view showing the configuration of a side curtain airbag according to still another embodiment of the present invention.

Referring to FIG. 11, the side curtain airbag 50 includes a main panel 55 to form the main chamber 51 and a protrusion panel 57 to form a protrusion chamber 52.

The protrusion panel 57 is coupled to an inner front portion of the main panel 55 through a sewing line S4. The main panel 55 is formed therein with a vent hole 55h so that the main chamber 51 communicates with the protrusion chamber 52 through the vent hole 55h.

When the airbag is inflated, the protrusion chamber 52 blocks the space between the main chamber 51 of the side curtain airbag 50 and the main chamber 31 of the driver seat airbag 30, thereby preventing the head of the occupant O from protruding toward the space between the side curtain airbag 50 and the driver seat airbag 30.

FIG. 12 is a cross sectional view showing another example of the side curtain airbag of FIG. 11.

Referring to FIG. 12, a side curtain airbag 60 is configured to have a main chamber 61, a front end of which more extends toward the front of the vehicle than the side curtain airbag 50, so that the front end of the main chamber 61 is substantially positioned at the front of the driver seat airbag 30.

A protrusion panel 67 to confine a protrusion chamber 62 is coupled to an inner part of a main panel 65 to form the main chamber 61 through a sewing line S5.

The main panel 65 is formed therein with a vent hole 65h so that the main chamber 61 communicates with the protrusion chamber 62 through the vent hole 65h.

When the airbag is inflated, the protrusion chamber 62 is positioned at the front of the driver seat airbag 30 to support the driver seat airbag 30 while blocking the space between the main chamber 61 of the side curtain airbag 60 and the driver seat airbag 30.

As a result, the head of the occupant O can be effectively prevented from protruding toward the space between the side curtain airbag 60 and the driver seat airbag 30.

FIG. 13 is a cross sectional view showing the configuration of a knee airbag according to still another embodiment of the present invention.

Referring to FIG. 13, a knee airbag 70 is stored in a folded state under an instrumental panel (not shown).

The knee airbag 70 includes a main chamber 71 inflated toward a knee K of the occupant O and a protrusion chamber 72 communicating with the main chamber 71 and inflated so that the protrusion chamber 72 more protrudes toward the occupant O than the main chamber 71 protrudes.

The knee airbag 70 includes a main panel 75 to confine the main chamber 71 and a protrusion panel 77 coupled to an outer portion of the main panel 75.

The protrusion panel 77 is coupled to the main panel 75 through a sewing line S6, and provided adjacent to a lateral side 8 of the vehicle.

When the airbag is inflated, the above configuration can effectively prevent the knee K of the occupant from colliding with the lateral side 8 of the vehicle.

According to another embodiment, protrusion chambers 72 may be provided at both sides of the main chamber 71 to cover both sides of a leg of the occupant O.

FIGS. 14a to 14c are cross sectional views showing the configuration of protrusion chambers according to still another embodiment of the present invention.

Hereinafter, an example in which the protrusion chamber 82 is applied to the side curtain airbag 50 will be described. A protrusion panel 87 to form the protrusion chamber 82 includes a first panel 87a and a second panel 87b. The deployment shape of the protrusion chamber 87 can be controlled by adjusting the length of the first and second panels 87a and 87b.

Referring to FIG. 14a, a length L1 of the first panel 87a is formed to be shorter than a length L2 of the second panel 87b. Through the above configuration, the protrusion chamber 82 is deployed while protruding toward the inner part and the rear portion of the vehicle.

Referring to FIG. 14b, the length L1 of the first panel 87a is formed to be substantially equal to the length L2 of the second panel 87b. Through the above configuration, the protrusion chamber 82 is deployed in parallel to the main chamber 51 and in a symmetrical form toward the front and the rear of the vehicle.

Referring to FIG. 14c, the length L1 of the first panel 87a of the protrusion panel 87 is formed to be longer than a length of the second panel 87b. Through the above configuration, the protrusion chamber 82 is deployed while protruding toward the inner part and the front of the vehicle.

The above protrusion panel may be applied to the passenger seat airbag, the driver seat airbag, and the knee airbag.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A vehicle airbag comprising:
   a main panel defining a main chamber deployable toward an inner part of a vehicle; and
   a protrusion panel provided outside the main panel to form at least one protrusion chamber that communicates with the main chamber through at least one vent hole formed in the main panel and protrudes toward the inner part of the vehicle based on the main chamber,
   wherein the protrusion panel is folded to have a wrinkle part when the vehicle airbag is not inflated, and
   wherein the protrusion panel is provided at a central portion thereof with central sewing lines spaced apart from each other by a predetermined distance, and a non-inflation region is formed between the central sewing lines, and the at least one vent hole is formed in the main panel between the central sewing lines and the both ends of the protrusion panel such that two protrusion chambers are inflated about the non-inflation region.

2. The vehicle airbag of claim 1, wherein the wrinkle part is formed by folding the protrusion panel toward the main panel or toward the inner part of the vehicle.

3. The vehicle airbag of claim 1, wherein an inflation volume of the at least one protrusion chamber is adjusted by adjusting a number of wrinkle parts.

4. The vehicle airbag of claim 3, wherein a number of upper wrinkle parts of the protrusion panel is different from a number of lower wrinkle parts of the protrusion panel.

5. The vehicle airbag of claim 4, wherein a number of the at least one vent hole or a size of the at least one vent hole is varied depending on the inflation volume of the at least one protrusion chamber.

6. The vehicle airbag of claim 1, wherein the protrusion panel comprises first and second panels and a deployment shape of the at least one protrusion chamber is controlled by adjusting lengths of the first and second panels.

7. The vehicle airbag of claim 1, wherein the vehicle airbag is selected from a group consisting of a driver seat airbag, a passenger seat airbag, a side curtain airbag, and a knee airbag.

8. The vehicle airbag of claim 7, wherein the vehicle airbag is a passenger seat airbag, the a front panel is for making contact with a head of an occupant; and
   the protrusion panel is coupled to an outside of the front panel and provided in at least one side thereof with the wrinkle part.

9. The vehicle airbag of claim 8, wherein both ends of the protrusion panel are coupled to both ends of the front panel of the main panel.

10. The vehicle airbag of claim 1, in combination with the vehicle.

11. A method of using an airbag to protect an occupant of a vehicle, the method comprising:
    providing the airbag to include a main panel and a protrusion panel, the main panel forming a main chamber deployable toward an inner part of the vehicle, the protrusion panel provided outside the main panel to form at least one protrusion chamber that communicates with the main chamber through at least one vent hole formed in the main panel and protrudes toward the inner part of the vehicle based on the main chamber, the protrusion panel is provided at a central portion of the main panel with central sewing lines spaced apart from each other by a predetermined distance, and a non-inflation region is formed between the central sewing lines, and the at least one vent hole is formed in the main panel between the central sewing lines and the both ends of the protrusion panel such that two protrusion chambers are inflated about the non-inflation region;

folding the protrusion panel to have a wrinkle part when the airbag is not inflated; and inflating the main panel and the protrusion panel so as to define the non-inflation region recessed between first and second inflated regions.

12. The method of claim 11, wherein folding the protrusion part includes folding the protrusion panel toward the main panel or toward the inner part of the vehicle.

13. The method of claim 11, further comprising adjusting an inflation volume of the at least one protrusion chamber by folding the protrusion panel to include at least one additional wrinkle part.

14. The method of claim 11, wherein folding the protrusion part includes folding an upper part of the protrusion panel to include a first number of upper wrinkle parts and folding a lower part of the protrusion panel to include a second number of lower wrinkle parts.

15. The method of claim 14, wherein the first number is different than the second number.

* * * * *